United States Patent
Braskich et al.

(10) Patent No.: US 7,676,676 B2
(45) Date of Patent: Mar. 9, 2010

(54) METHOD AND APPARATUS FOR PERFORMING MUTUAL AUTHENTICATION WITHIN A NETWORK

(75) Inventors: Anthony J. Braskich, Palatine, IL (US); Stephen P. Emeott, Rolling Meadows, IL (US)

(73) Assignee: Motorola, Inc., Schaumburg, IL (US)

( * ) Notice: Subject to any disclaimer, the term of this patent is extended or adjusted under 35 U.S.C. 154(b) by 1150 days.

(21) Appl. No.: 11/273,421

(22) Filed: Nov. 14, 2005

(65) Prior Publication Data
US 2007/0162751 A1 Jul. 12, 2007

(51) Int. Cl.
*H04L 9/32* (2006.01)
(52) U.S. Cl. ...................................................... 713/169
(58) Field of Classification Search ................. 713/169
See application file for complete search history.

(56) References Cited

U.S. PATENT DOCUMENTS 7,236,477 B2 * 6/2007 Emeott et al. ............... 370/331
2006/0067526 A1 * 3/2006 Faccin et al. ................. 380/46

* cited by examiner

*Primary Examiner*—Gilberto Barron, Jr.
*Assistant Examiner*—Devin Almeida

(57) ABSTRACT

A method and apparatus for mutual authentication of a first and a second node is provided herein. During operation the first node sends a first authentication message to the second node comprising information needed for the second node to authenticate the first node and information needed by the second node for the second node to be authenticated by the first node. A second authentication message is received from the second node comprising information needed by the first node for the first node to be authenticated by the second node and information needed for the first node to authenticate the second node. Because the first and the second authentication messages comprise information needed for both the first and the second node to authenticate each other, messaging within the network is greatly reduced.

23 Claims, 4 Drawing Sheets

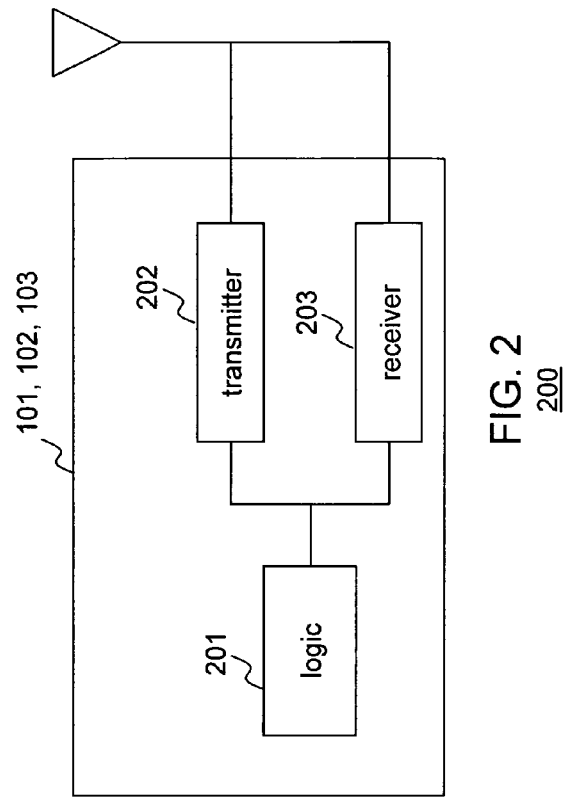
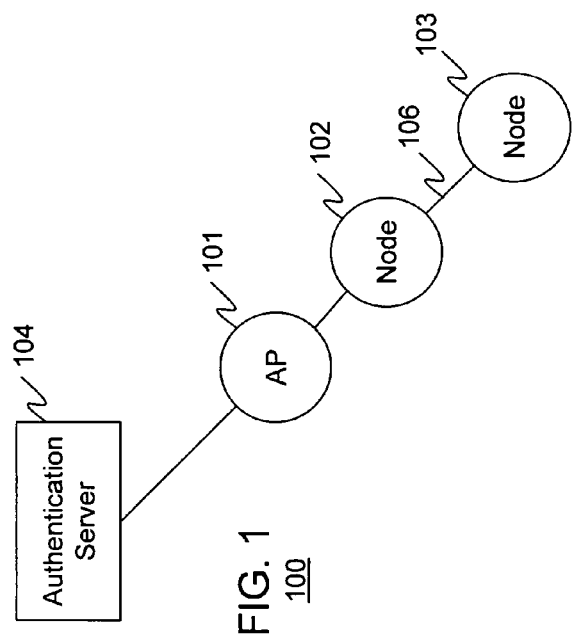
FIG. 1
100
FIG. 2
200

METHOD AND APPARATUS FOR PERFORMING MUTUAL AUTHENTICATION WITHIN A NETWORK

FIELD OF THE INVENTION

The present invention relates generally to authentication of nodes within a network and in particular, to a method and apparatus for performing mutual authentication within a network.

BACKGROUND OF THE INVENTION

In many networks a node will need to authenticate another node prior to communication taking place between the nodes. Such authentication, may take place by performing a full authentication exchange with a network entity such as an Authentication, Authorization, Accounting server (AAA server) or an Extensible Authentication protocol server (EAP server) that is aware of the node's rights with respect to network access. Such authentication can be done through a variety of methods and generally involves much messaging between the two nodes and the server.

When networks require mutual authentication (MA), each node must authenticate the other node prior to communication taking place. In other words, when a first node wishes to communicate with a second node, the first node must authenticate the second node, while the second node must similarly authenticate the first node. Because authentication methods generally involve many messages between the two nodes and the server, and because two nodes will have to authenticate each other when performing mutual authentication, mutual authentication requires extensive messaging between both nodes and the server. Because of this, a need exists for a method and apparatus for performing mutual authentication within a network that reduces the messaging between the two nodes.

BRIEF DESCRIPTION OF THE DRAWINGS

FIG. 1 is a block diagram of a network.

FIG. 2 is a block diagram of a node within the network of FIG. 1.

DETAILED DESCRIPTION OF THE DRAWINGS

Figure 3:
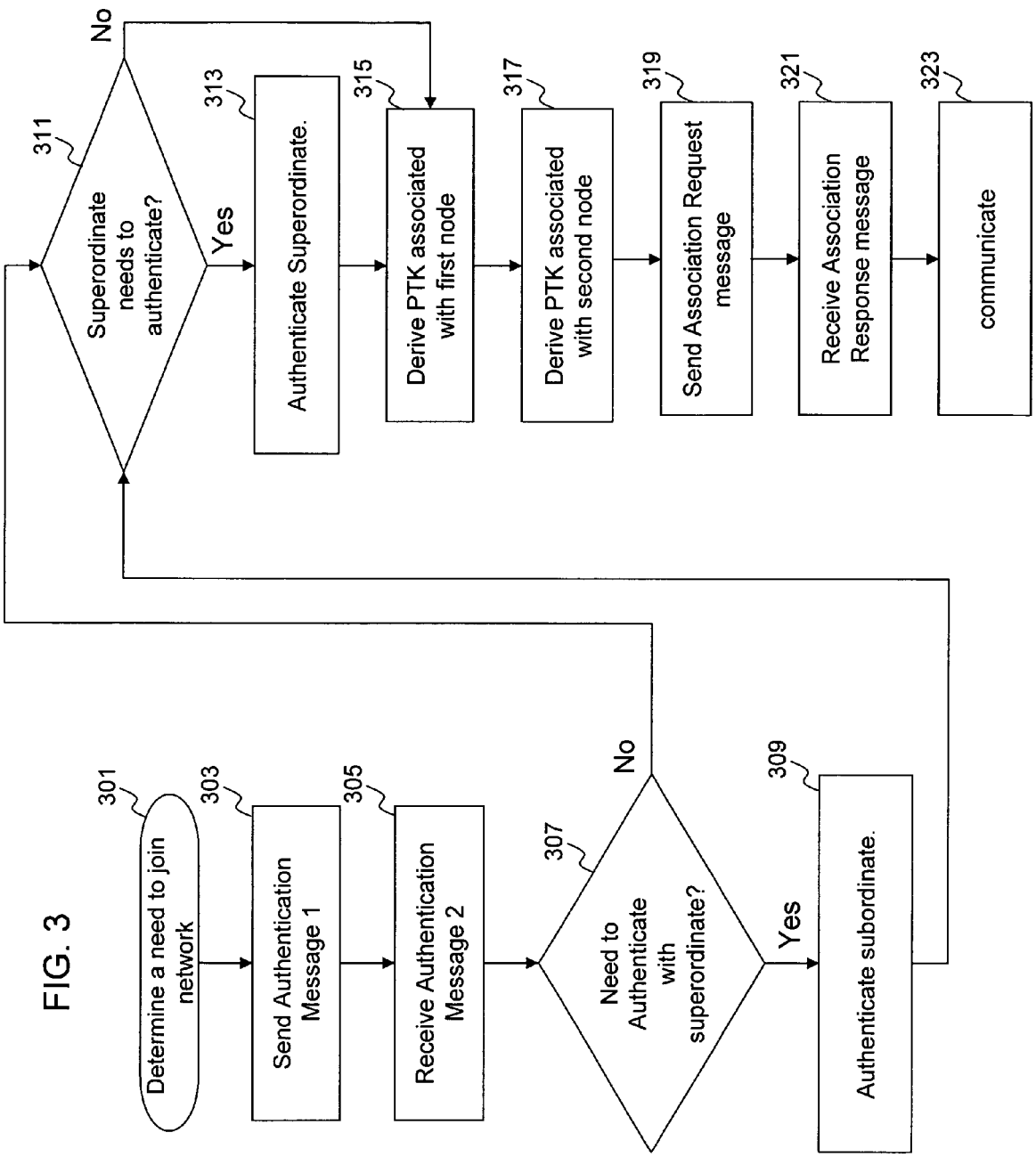
FIG. 3 is a flow chart showing operation of the node of FIG. 2.

In order to address the above-mentioned need, a method and apparatus for mutual authentication of a first and a second node is provided herein. During operation the first node sends a first authentication message to the second node comprising information needed for the second node to authenticate the first node and information needed by the second node for the second node to be authenticated by the first node. A second authentication message is received from the second node comprising information needed by the first node for the first node to be authenticated by the second node and information needed for the first node to authenticate the second node. Because the first and the second authentication messages comprise information needed for both the first and the second node to authenticate each other, messaging within the network is greatly reduced.

The present invention encompasses a method for mutual authentication of a first and a second node where the first and second nodes are peer nodes in a peer-to-peer network. A peer-to-peer network comprises nodes that simultaneously act as authenticators, authenticating the identity of a peer node, and as supplicants, being authenticated by a peer node. The method comprises the steps of sending a first authentication message to the second node, the first authentication message comprising information needed for the second node to authenticate the first node and information needed by the second node for the second node to be authenticated by the first node. A second authentication message is received from the second node, the second authentication message comprising information needed by the first node for the first node to be authenticated by the second node and information needed for the first node to authenticate the second node.

The present invention additionally encompasses an apparatus for performing mutual authentication. The apparatus comprises a transmitter sending a first authentication message to a second node, the first authentication message comprising information needed for the second node to authenticate the first node and information needed by the second node for the second node to be authenticated by the first node. The apparatus additionally comprises a receiver receiving a second authentication message from the second node, the second authentication message comprising information needed by the first node for the first node to be authenticated by the second node and information needed for the first node to authenticate the second node.

Turning now to the drawings, wherein like numerals designate like components, FIG. 1 is a block diagram of network 100. In the preferred embodiment of the present invention, network 100 utilizes a network protocol as described by the IEEE 802.11 specification. However, in alternate embodiments network 100 may utilize other network protocols such as, but not limited to, a network protocol defined by the IEEE 802.16 standard, a network protocol defined by the IEEE 802.15.3 Wireless Personal Area Networks for High Data Rates standard, or the network protocol defined by the IEEE 802.15.4 Low Rate Wireless Personal Area Networks standard, . . . , etc.

Network 100 includes a number of network elements such as access point 101, node 102, node 103, and server 104. Although only a single access point 101 and two nodes 102 and 103 are shown, one of ordinary skill in the art will recognize that typical networks comprise many access points in communication with many nodes.

As shown, node 103 and node 102 are in communication via communication signal 106. Communication signal 106 preferably comprises transmissions over an RF communication channel, but alternatively may comprise any transmission, either wired or wireless. It is contemplated that network elements within network 100 are configured in well known manners with processors, memories, instruction sets, and the like, which function in any suitable manner to perform the function set forth herein.

As discussed above, when node 102 and node 103 wish to communicate with each other, a mutual authentication procedure will need to take place so that each node can properly authenticate the other. During operation, node 103 authenticates node 102 by enabling a full authentication exchange between node 102 and authentication server 104. In a similar manner, node 102 authenticates node 103 by enabling a full authentication exchange between node 103 and authentication server 104.

Once both nodes have been authenticated, communication then can take place between nodes 102 and 103. Particularly, authentication with network 100 will result in server 104 providing nodes 102 and 103 a Pair-wise Master Key (PMK)

that may then be utilized to generate temporary session keys (e.g., a Pair-wise Transient Key (PTK)) used for encryption and authorization. More specifically, each communication session between a first node and a second node utilizes a session key for such things as encrypting and providing integrity protection for the exchanged traffic. The session key used for a particular node is a function of the PMK, Node Identifiers, and two other numbers (fresh values, FV). In other words:

Session key=$f$(PMK, first_node_ID, second_node_ID, first_node_FV, second_node_FV).

The first_node_FV is generated by the first node and the second_node_FV is generated by the second node. In the preferred embodiment of the present invention fresh values comprise random numbers. In alternate embodiments, however, fresh values may comprise other forms such as, but not limited to time stamps, frame numbers, and nonces.

As discussed above, mutual authentication can be done through a variety of methods and generally involves much messaging between the nodes 102 and 103. In order to address this issue, messaging is reduced by sending and receiving messages that each contain information for both the first node to authenticate the second node, and the second node to authenticate the first node.

FIG. 2 is a block diagram of node 200. As shown, node 200 comprises logic circuitry 201, transmit circuitry 202, and receive circuitry 203. Logic circuitry 201 preferably comprises a microprocessor controller, such as, but not limited to a Motorola PowerPC microprocessor. In the preferred embodiment of the present invention logic circuitry 201 serves as means for controlling node 200, and as means for analyzing received message content, and means for generating messaging necessary for mutual authentication. Transmit and receive circuitry 202-203 are common circuitry known in the art for communication utilizing a well known network protocols, and serve as means for transmitting and receiving messages. For example, for nodes 101-103, transmitter 202 and receiver 203 are well known IEEE 802.11 transmitters and receivers that utilize the IEEE 802.11 network protocol. Other possible transmitters and receivers include, but are not limited to transceivers utilizing Bluetooth, IEEE 802.16, or HyperLAN protocols.

FIG. 3 is a flow chart showing operation of node 200 (e.g., a first node, which is a subordinate node) during mutual authentication. The logic flow begins at step 301 when logic circuitry 201 determines a need to join network 100. At step 303 logic circuitry 201 instructs transmitter 202 to transmit a first authentication message. The first authentication message comprises:

information needed for a second node (superordinate node) to authenticate the first node; and information needed by the second node for the second node to be authenticated by the first node.

The information in the first authentication message needed for the second node to authenticate the first node comprises a mutual authentication information element identifying the first node as a node to be authenticated, a Robust Security Network (RSN) information element identifying a key suite to be used for authenticating the first node, and an Extensible Authentication Protocol over LAN Key (EAPOL-Key) message containing a nonce created by the first node. The RSN information element in the first authentication message also optionally identifies a first pair-wise master key to be used for deriving the first PTK. Finally, the information needed in the first authentication message by the second node for the second node to be authenticated by the first node comprises a mutual authentication information element identifying the second node as the node to be authenticated, and an EAPOL-Key message containing a nonce created by the first node.

At step 305 a second authentication message is received by receiver 203. The second authentication message is received from the second node and comprises:

information needed by the first node for the first node to be authenticated by the second node; and information needed for the first node to authenticate the second node.

The information needed in the second authentication message by the first node for the first node to be authenticated by the second node comprises a mutual authentication information element identifying the first node as a node to be authenticated, an RSN information element identifying a key suite to be used for authenticating the first node, and an EAPOL-Key message containing a nonce created by the second node. The RSN information element in the second authentication message and needed for the first node to be authenticated by the second node also optionally identifies a first pair-wise master key to be used for deriving the first PTK. The information needed in the second authentication message for the first node to authenticate the second node comprises a mutual authentication information element identifying the second node as the node to be authenticated, an RSN information element identifying a key suite to be used for authenticating the second node, and an EAPOL-Key message containing a nonce created by the second node. Finally, the RSN information element in the second authentication message and needed for the first node to authenticate the second node also optionally identifies a second pair-wise master key to be used for deriving the second PTK.

At step 307 a determination is made by logic circuitry 201 whether or not the first node needs to be authenticated. Particularly, if the first node has previously authenticated with the second node, such as during previous communication, and a pair-wise master key was stored at the second node, then authentication may not be required. Alternatively, pre-programmed keys, shared between the first and second node, may be in place, preventing the need for authentication to create a pair-wise master key.

If, at step 307 it is determined that authentication needs to take place, then the logic flow continues to step 309 where authentication server 104 is accessed by logic circuitry 201, and the first node is authenticated. If, however, it is determined that authentication does not need to take place, the logic flow continues to step 311 where it is determined if the second node needs to be authenticated. Particularly, if the second node has previously authenticated with the first node, such as during previous communication, and a pair-wise master key was stored at the first node, then authentication may not be required. Alternatively, pre-programmed keys, shared between the second and first node, may be in place, preventing the need for authentication to create a pair-wise master key.

If, at step 311 it is determined that the second node needs to be authenticated, then the logic flow continues to step 313 where logic circuitry 201 accesses authentication server 104, and the second node is authenticated. The logic flow then continues to step 315.

At step 315 the first PTK is derived by logic unit 201, and at step 317 the second PTK is derived by logic unit 201. The first and the second PTK are used for encrypted communication between the first and the second nodes. More particularly, a portion, or subset, of the PTK may be used to encrypt and protect the integrity of data traffic sent between the first and second nodes. Other portions of the PTK may be used for specialized functions such as securing keys during transport between the first and second nodes.

At step 319, an association request message is sent by transmitter 202. The association request message comprises:
information needed by the second node to derive and validate a first PTK; and
information needed by the second node to derive and validate a second PTK.

The information in the association request message needed by the second node to derive and validate the first PTK comprises a mutual authentication information element identifying the first node as the node to be authenticated, an RSN information element identifying a first pair-wise master key used for deriving the first PTK, and an EAPOL-Key message containing a message integrity check value calculated using the first PTK. The information in the association request message needed by the second node to derive and validate the second PTK comprises a mutual authentication information element identifying the second node as the node to be authenticated, an RSN information element identifying a second pair-wise master key used for deriving the second PTK, and an EAPOL-Key message containing a message integrity check value calculated using the second PTK, and a group key used by the first node.

At step 321 receiver 203 receives an association response message. The association response message comprises:
information needed by the first node to validate the second PTK; and
information needed by the first node to validate the first PTK.

The information needed in the association response message by the first node to validate the first PTK comprises a mutual authentication information element identifying the first node as the node to be authenticated, an RSN information element identifying a first pair-wise master key used for deriving the first PTK, and an EAPOL-Key message containing a message integrity check value calculated using the first PTK, and a group key used by the second node. The information needed in the association response message by the first node to validate the second PTK comprises a mutual authentication information element identifying the second node as the node to be authenticated, an RSN information element identifying a second pair-wise master key used for deriving the second PTK, and an EAPOL-Key message containing a message integrity check value calculated using the second PTK.

Finally, at step 323 mutually-authenticated communication then takes place between the first and the second nodes.

Figure 4:
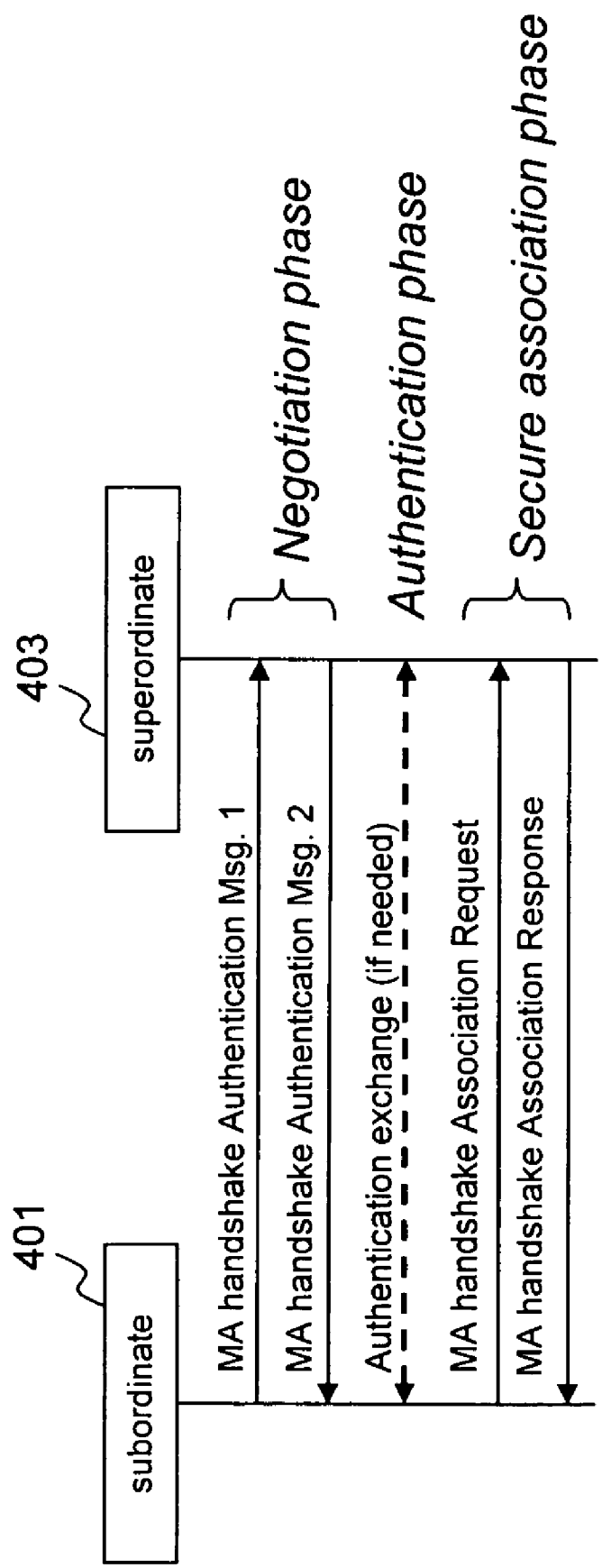
FIG. 4 and FIG. 5 are message-flow diagrams illustrating messaging between nodes during mutual authentication.

FIG. 4 is a message flow diagram showing messaging between nodes during mutual authentication. In FIG. 4, subordinate node 401 will need to authenticate superordinate node 403 and vice versa. As shown, mutual authentication can be broken down into a negotiation phase, an authentication phase, and a secure association phase. During the negotiation phase the first authentication message is sent from subordinate node 401 to superordinate node 403, while a second authentication message is sent from superordinate node 403 to the subordinate node 401. With the information provided in the first and the second authentication messages, nodes 401 and 403 can properly authenticate each other during the authentication phase. Finally, during secure association, an association request message is send from subordinate node 401 and an association response message is sent from superordinate node 403. During the secure association phase each node 401 and 403 derives the appropriate PTKs necessary for secure communication.

Figure 5:
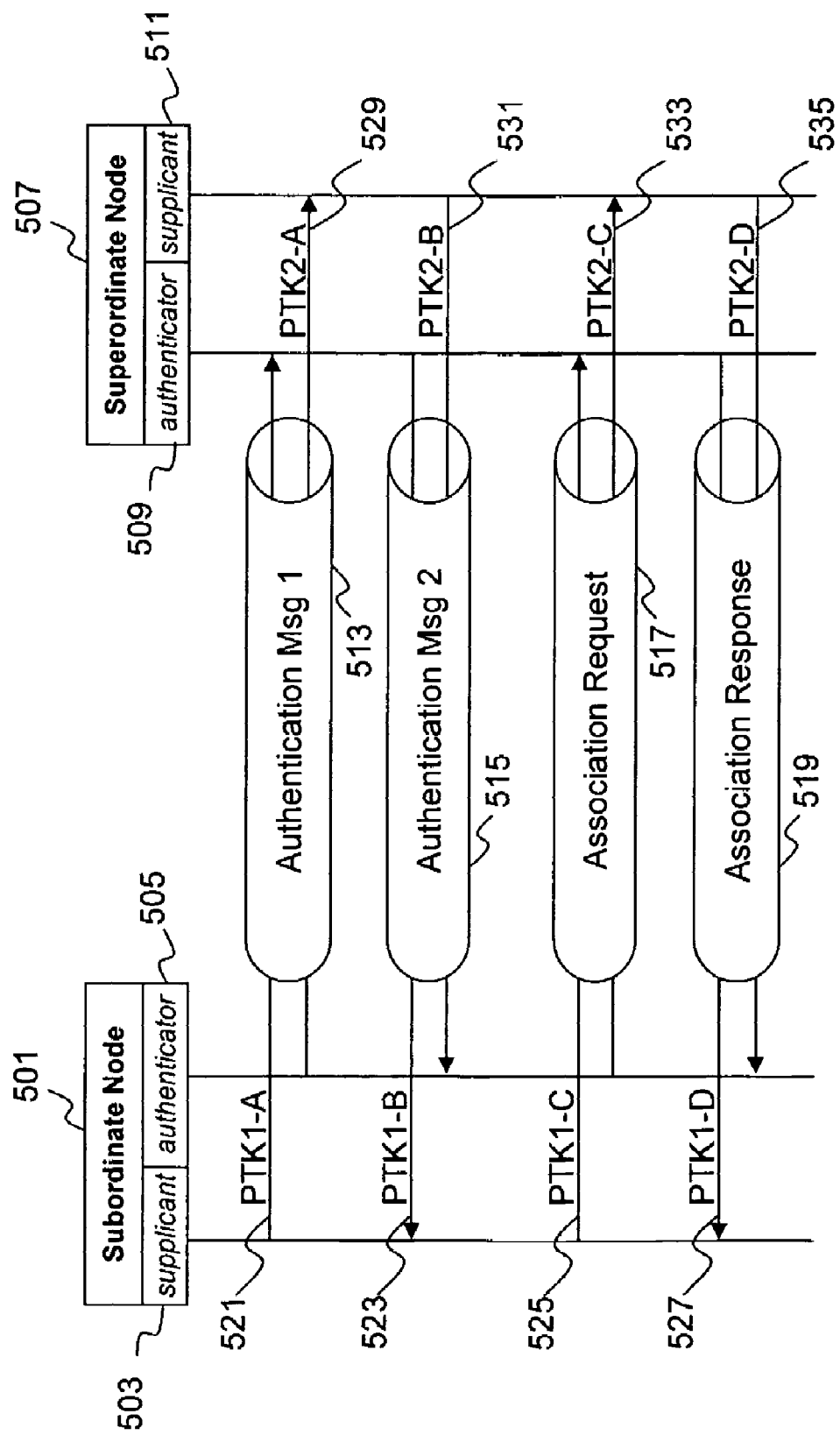

FIG. 5 is a message flow diagram showing messages transmitted between the supplicant and authentication processes running on nodes during mutual authentication. In FIG. 5, subordinate node 501 runs supplicant process 503 and authenticator process 505. Authenticator process 505 is responsible for authenticating superordinate node 507 while supplicant process 503 must transmit messages to be used by node 507 to authenticate node 501. Similarly, superordinate node 507 runs its own supplicant process 511 and authenticator process 509. Authenticator process 509 is responsible for authenticating node 501 while supplicant process 511 must transmit messages to be used by node 501 to authenticate node 507.

First authentication message 513 in the mutual authentication handshake is sent from subordinate node 501 to superordinate node 507. First authentication message 513 comprises a plurality of information elements 521 (PTK1-A), and a plurality of information elements 529 (PTK2-A). The information elements PTK1-A are needed for the superordinate node to authenticate the subordinate node and are sent from supplicant process 503 of subordinate node 501 to authenticator process 509 of superordinate node 507. The information elements PTK2-A are needed by the superordinate node for the superordinate node to be authenticated by the subordinate node and are sent from authenticator process 505 of subordinate node 501 to supplicant process 511 of superordinate node 507. The plurality of information elements PTK1-A 521 comprises a mutual authentication information element identifying the subordinate node as a node to be authenticated, an RSN information element identifying a key suite to be used for authenticating the subordinate node, and an EAPOL-Key message containing a nonce created by the subordinate node. The RSN information element also optionally identifies a first pair-wise master key to be used for deriving the first PTK. The plurality of information elements PTK2-A 529 comprises a mutual authentication information element identifying the superordinate node as the node to be authenticated, and an EAPOL-Key message containing a nonce created by the subordinate node.

Second authentication message 515 in the mutual authentication handshake is sent from superordinate node 507 to subordinate node 501. The second authentication message comprises a plurality of information elements 523 (PTK1-B), and a plurality of information elements 531 (PTK2-B). The information elements PTK1-B are needed by the subordinate node for the subordinate node to be authenticated by the superordinate node and are sent from authenticator process 509 of superordinate node 507 to supplicant process 503 of subordinate node 501. The information elements PTK2-B are needed for the subordinate node to authenticate the superordinate node and are sent from supplicant process 511 of superordinate node 507 to authenticator process 505 of subordinate node 501. The plurality of information elements PTK1-B 523 comprises a mutual authentication information element identifying the subordinate node as a node to be authenticated, an RSN information element identifying a key suite to be used for authenticating the subordinate node, and an EAPOL-Key message containing a nonce created by the superordinate node. The RSN information element in the second authentication message and needed for the subordinate node to be authenticated by the superordinate node also optionally identifies a first pair-wise master key to be used for deriving the first PTK. The plurality of information elements PTK2-B 531 comprises a mutual authentication information element identifying the superordinate node as the node to be authenticated, an RSN information element identifying a key suite to be used for authenticating the superordinate node, and an EAPOL-Key message containing a nonce created by the superordinate node. Finally, the RSN information element in the second authentication message needed for the subordinate node to authenticate the superordinate node also optionally identifies a second pair-wise master key to be used for deriving the second PTK.

Association request message 517 in the mutual authentication handshake is sent from subordinate node 501 to superordinate node 507. The association request message comprises a plurality of information elements 525 (PTK1-C), and a plurality of information elements 533 (PTK2-C). The information elements PTK1-C are needed by the superordinate node to derive and validate a first PTK and are sent from supplicant process 503 of subordinate node 501 to authenticator process 509 of superordinate node 507. The information elements PTK2-C are needed by the superordinate node to derive and validate a second PTK and are sent from authenticator process 505 of subordinate node 501 to supplicant process 511 of superordinate node 507. The plurality of information elements PTK1-C 525 comprises a mutual authentication information element identifying the subordinate node as the node to be authenticated, an RSN information element identifying a first pair-wise master key used for deriving the first PTK, and an EAPOL-Key message containing a message integrity check value calculated using the first PTK. The plurality of information elements PTK2-C 533 comprises a mutual authentication information element identifying the superordinate node as the node to be authenticated, an RSN information element identifying a second pair-wise master key used for deriving the second PTK, and an EAPOL-Key message containing a message integrity check value calculated using the second PTK, and a group key used by the subordinate node.

Association response message 519 in the mutual authentication handshake is sent from superordinate node 507 to subordinate node 501. The association response message comprises a plurality of information elements 527 (PTK1-D), and a plurality of information elements 535 (PTK2-D). The information elements PTK1-D are needed by the subordinate node to validate the first PTK and are sent from authenticator process 509 of superordinate node 507 to supplicant process 503 of subordinate node 501. The information elements PTK2-D are needed by the subordinate node to validate the second PTK and are sent from supplicant process 511 of superordinate node 507 to authenticator process 505 of subordinate node 501. The plurality of information elements PTK1-D 527 comprises a mutual authentication information element identifying the subordinate node as the node to be authenticated, an RSN information element identifying a first pair-wise master key used for deriving the first PTK, and an EAPOL-Key message containing a message integrity check value calculated using the first PTK, and a group key used by the superordinate node. The plurality of information elements PTK2-D 535 comprises a mutual authentication information element identifying the superordinate node as the node to be authenticated, an RSN information element identifying a second pair-wise master key used for deriving the second PTK, and an EAPOL-Key message containing a message integrity check value calculated using the second PTK.

As discussed above, network 100 utilizes a network protocol as described by the IEEE 802.11 specification. The following text provides changes to the IEEE 802.11 specification that facilitate the above-described messaging.

5.3.1 Specific Management Frame Types 5.3.1.6 Authentication Frame Format

Add the following rows to the end of IEEE Std 802.11®-1999 Table 14 in Clause "7.2.3.10 Authentication frame format":

TABLE 1

| | | | Presence of information elements |
|---|---|---|---|
| Authentication algorithm | Authentication transaction sequence no. | Status code | Presence of information elements |
| Mesh Mutual Authentication | 1 | Reserved | Mutual authentication IE, RSNIE, EAPKIE present |
| Mesh Mutual Authentication | 2 | Status | Mutual authentication IE, RSNIE, TIE, EAPKIE present |

5.3.3 Information Elements 5.3.3.1 WLAN Mesh Capability Element

Change the figure and table to reflect the addition of the security field:

TABLE 2

WLAN Mesh Capability Element

| octets: 1 | 4 | 2 | 1 | 1 | 4 | 4 | 1 |
|---|---|---|---|---|---|---|---|
| D | length | version | active protocol ID | active metric ID | peer capacity | power save capability | synch capability | channel precedence | multi channel capability | security |

The security field indicates the security capabilities of the MP. The security field is defined in Table 3:

TABLE 3

| Security field | |
|---|---|
| B7 | B6-B0 |
| MA Handshake | Reserved |

The MA Handshake bit indicates, when set, that the MP supports the mutual authentication handshake defined in 6.5.4.

5.3.3.15 Mutual Authentication Element

The mutual authentication IE identifies the supplicant MP when an authentication set is included in a message. The number of IEs in the authentication set are specified, along with properties of the final IE.

The mutual authentication IE is depicted in Table 4.

TABLE 4

Mutual Authentication information element

| Octets: 1 | 1 | 6 | 1 | 1 |
|---|---|---|---|---|
| ID | Length | Supplicant Address | IE Count | EAPOL Contents |

The Supplicant Address field contains the MAC address of the MP acting as supplicant for the security association being established through the use of the IEs within the authentication set. The IE Count field indicates the number of IEs that belong to the authentication set, including the mutual authentication IE.

The EAPOL Contents subfield is defined in Table 5:

TABLE 5

EAPOL Contents subfield

| B7 | B6 | B5-B0 |
|---|---|---|
| EAPKIE present | MIC Protection | Reserved |

When an EAPKIE is included in an authentication set, the EAPKIE present subfield must be set to 1, and the EAPKIE must be the final IE in the authentication set. If no EAPKIE is included in the authentication set, the EAPKIE present subfield is set to 0, and there is no restriction on the type of the final IE of the authentication set. If an EAPKIE is present and the EAPOL-Key message contains a MIC that is calculated over the authentication set for protection, the MIC Protection subfield is set to 1.

5.3.3.16 Time Interval Element

This generic Time Interval Information Element is defined to specify various types of time intervals and timeouts. This information element is defined in Table 6.

TABLE 6

Time interval information element

| Octets: 1 | 1 | 1 | 2 |
|---|---|---|---|
| Element ID | Length | Interval type | Interval value |

The length field shall contain a value 0x03.

The Interval type field must contain one of the values from Table 7.

TABLE 7

Interval type field

| Value | Meaning |
|---|---|
| 0x00 | Reserved |
| 0x01 | Re-Association Deadline (in TUs) |
| 0x02 | Key Lifetime Interval (in minutes) |
| 0x03 | Handshake Completion Deadline (in TUs) |
| 0x04-0xFF | Reserved |

The interval value shall be an unsigned 16-bit integer representing the number of TUs if the type value is Re-Association Deadline (0x01) or Handshake Completion Deadline (0x03), or minutes if the type value is Key Lifetime (0x02).

5.3.3.17 802.1X EAPOL-Key Element (EAPKIE)

This element is defined to encapsulate an 802.1X EAPOL-Key message. The information element is defined in Table 8.

TABLE 8

EAPOL-Key information element

| Octets: 1 | 1 | Variable |
|---|---|---|
| Element ID | Length | 802.1X EAPOL-Key message |

The length shall be set to the length of the EAPOL-Key message.

6.5.4 Mutual Authentication Handshake

The Mutual Authentication (MA) handshake is an optional procedure that may be used to establish a secure association between two MPs in a WLAN mesh. The MA handshake may be used in place of association followed by two separate 4-way handshakes to establish security.

The MA handshake performs mutual authentication by establishing bidirectional RSNA security when two MPs associate. In other words, two pairwise keys (PTK1 and PTK2) are derived as a result of the MA handshake. To enable the derivation of the two PTKs, the MPs may each perform 802.1X EAP authentication during one phase of the MA handshake, generating the required master keys.

The MA handshake is compatible with all supported AKM suites. Additionally, both centralized and distributed authentication are supported.

The MA handshake efficiently completes association and RSNA security establishment. To do this, it employs Authentication and Association management frames to carry the messages of the 4-way handshake in information elements. Additionally, as bidirectional security is established, messages enabling two PTK derivations are carried simultaneously in the MA handshake messages.

In addition to requiring mutual authentication, the bidirectional RSNA security establishment permits a group key (GTK) to be established for both the subordinate and superordinate MPs. This enables both MPs to securely transmit multicast traffic. The GTKs are exchanged as a portion of the final two messages of the MA handshake.

The MA handshake may be conceptually divided into three phases, which are described in detail in the following section. Within these phases, the four messages constituting the MA handshake are exchanged. The details of these messages, and, in particular, the method of performing the PTK derivations, is given in "6.5.4.2 PTK Derivation in the MA Handshake".

6.5.4.1 Phases of the MA Handshake

The MA handshake consists of three non-overlapping phases: negotiation, authentication, and secure association. The authentication phase may be omitted if key-generating authentication is not needed or has occurred (specifically, both MPs must each have two valid PMKSAs in order to derive PTK1 and PTK2).

The negotiation phase consists of the two Authentication transaction messages of the MA handshake. The secure association phase consists of the Association Request and Response messages of the MA handshake. The contents of these four messages are described in detail in a subsequent section. The remainder of this section focuses on the overall MA handshake procedure and determining the need for and contents of the authentication phase. The MA handshake is summarized in FIG. 4. During the authentication phase, each MP may be required to act as an 802.1X authenticator, to enable EAP authentication between the neighbor MP and an Authentication Server. It is assumed that the superordinate is able to connect to the AS via the mesh. However, when a subordinate is creating its first contact to the WLAN mesh, it may be unable to communicate with the AS (i.e., its connection via the superordinate has not been fully established). Thus, the MA handshake may not be used when the subordinate must act as an EAP pass-through authenticator and has no connection to the AS.

6.5.4.1.1 Negotiation Phase

The first two messages of the MA handshake permit a negotiation of the cipher suites and AKM suites that affect the derivations of PTK1 and PTK2. The negotiation takes place using the RSN IE.

Prior to initiating the MA handshake, it is assumed that the subordinate MP will have received a beacon or probe response from the superordinate that contains an RSN IE. This RSN IE advertises the cipher suites and AKM suites supported by the superordinate, as well as its ability to perform the MA handshake.

To begin the MA handshake, the subordinate sends the MA Handshake Authentication Message 1. An RSN IE is included that specifies the subordinate's desired cipher suite and AKM suite for use in deriving PTK1. The selected suites must be among those supported by the superordinate. The RSN IE may also include one or more PMKIDs referring to PMKSAs that the subordinate believes to be valid for deriving PTK1.

Additionally, in Authentication Message 1, the subordinate includes a second RSN IE; this is the same IE that is advertised in the subordinate's beacons and probe responses. This provides the subordinate's supported cipher and AKM suites to the superordinate, which may not have received the subordinate's beacons or probe responses.

MA Handshake Authentication Message 2 is sent from the superordinate to the subordinate. The superordinate includes an RSN IE that echoes the subordinate's desired cipher suite and AKM suite for use in deriving PTK1. If one or more valid PMKIDs were specified by the subordinate (for deriving PTK1), the superordinate includes one of these PMKIDs to indicate the PMKSA to be used for PTK1 derivation. If no PMKID is included in the RSN IE, a PMK must be created, such as via 802.1X authentication.

Additionally, in Authentication Message 2, the superordinate includes a second RSN IE. This second RSN IE is used to specify the superordinate's desired cipher suite and AKM suite for use in deriving PTK2. The selected suites must be among those supported by the subordinate. The RSN IE may also include one or more PMKIDs referring to PMKSAs that the superordinate believes to be valid for deriving PTK2.

6.5.4.1.2 Authentication Phase

The authentication phase of the MA handshake occurs, if necessary, before the MA Handshake Association Request is sent. The need for the authentication phase is determined by the contents of the PMKID list in each RSN IE contained in Authentication Message 2.

If no valid PMKID for the purpose of PTK1 derivation was included in the RSN IE, then the subordinate must authenticate during the authentication phase. To initiate 802.1X authentication, the superordinate will send an EAP Request/Identity message to the subordinate. Authentication is complete when the EAP-Success message is sent to the subordinate.

If the superordinate specified no PMKIDs for deriving PTK2, or if none of the specified PMKIDs are valid, then the superordinate must authenticate during the authentication phase. To initiate 802.1X authentication, the subordinate will send an EAP Request/Identity message to the superordinate. Authentication is complete when the EAP-Success message is sent to the superordinate.

When two authentications take place during the authentication phase, they may occur interleaved. In such a case, the authentication phase is complete when the subordinate has both sent and received a valid EAP-Success message. At the conclusion of the authentication phase, both subordinate and superordinate must possess the PMKs necessary for creation of PTK1 and PTK2.

6.5.4.1.3 Secure Association Phase

The secure association phase of the MA handshake consists of the MA Handshake Association Request & Response messages. This phase completes the derivation of both PTK1 and PTK2.

The subordinate initiates the secure association phase by sending an Association Request message. The subordinate includes an RSN IE specifying the negotiated AKM and cipher suites to be used in deriving PTK1. Additionally, the PMK to be used for derivation of PTK1 is included in the PMKID list, whether it was specified in the negotiation phase or was newly created in the authentication phase.

Additionally, in the Association Request message, the subordinate includes an RSN IE that contains the negotiated AKM and cipher suites for PTK2 derivation. If the superordinate had indicated a PMKSA in Authentication Message 2 that is valid for deriving PTK2, this is included in the RSN IE; otherwise, the PMKID refers to a PMK created during the superordinate's authentication in the authentication phase.

After the Association Response message has been sent, one PTK is installed for protection of pairwise traffic between the two MPs. If the superordinate MP has a higher MAC address than that of the subordinate, then PTK1 is installed; otherwise, PTK2 is installed.

6.5.4.2 PTK Derivation in the MA Handshake

The negotiation phase of the MA Handshake comprises Authentication messages 1 and 2, while the secure association phase comprises the Association Request and Response messages. These four messages perform association between the subordinate and superordinate, along with two PTK derivations. The four MA Handshake messages can be used in place of an Association Request and Response, followed by two 4-way handshakes. Thus, it reduces a 10-message sequence to four messages.

The handshake embeds two simultaneous PTK derivations in its four messages. The PTK derivations occur through a message exchange between supplicant and authenticator processes at the two MPs. The messages exchanged are EAPOL-Key messages.

The derivation for PTK1 consists of four EAPOL-Key messages, which are labeled PTK1-#1, -#2, -#3, and -#4. Likewise, the derivation for PTK2 consists of four EAPOL-Key messages, which are labeled PTK2-#1, -#2, -#3, and -#4. The definitions of the EAPOL-Key messages are given in a subsequent section.

The calculation of the PTKs is possible after the authentication phase has completed. The calculation relies on nonce values exchanged in Authentication messages 1 and 2. The PTK calculation is given by:

$$PTK1 = PRF\text{-}384(PMK(1), \text{``MA Pairwise key expansion''}, \text{nonce(sub)}, \text{nonce(sup)}, \text{Min}(A[\text{sub}], A[\text{sup}]), \text{Max}(A[\text{sub}], A[\text{sup}]))$$

$$PTK2 = PRF\text{-}384(PMK(2), \text{``MA Pairwise key expansion''}, \text{nonce(sup)}, \text{nonce(sub)}, \text{Min}(A[\text{sub}], A[\text{sup}]), \text{Max}(A[\text{sub}], A[\text{sup}]))$$

where:

PRF-384 is the pseudo-random function defined in 802.11ma 8.5.1

PMK(1) is the PMK that is valid for use in deriving PTK1

PMK(2) is the PMK that is valid for use in deriving PTK2 nonce(sub) is a nonce generated by the subordinate nonce(sup) is a nonce generated by the superordinate A[sub] is the MAC address of the subordinate A[sup] is the MAC address of the superordinate FIG. 5 depicts the inter-process communication that facilitates the PTK derivation. The subordinate's supplicant process and the superordinate's authenticator process exchange EAPOL-Key messages for deriving PTK1. Likewise, the subordinate's authenticator process and the superordinate's supplicant process exchange EAPOL-Key messages for deriving PTK2. In both cases, the Authentication and Association Request/Response frames transport the EAPOL-Key messages.

In addition to the EAPOL-Key messages, the MA handshake messages contain other information elements that permit the PTK derivation to occur. Because two PTK derivations take place during the MA handshake, the mutual authentication IE is used to separate the message contents. The contents and format of the MA handshake messages are described in the subsequent sections.

6.5.4.2.1 Authentication Sets of Information Elements

In the MA handshake, two security associations are established, resulting in the derivation of two PTKs. Both PTK derivations are accomplished by passing EAPOL-Key messages (within EAPKIEs). The mutual authentication IE indicates the beginning of an authentication set of IEs that relate to the establishment of a security association in one direction of a link. Because two PTK derivations occur in parallel, two authentication sets (and two mutual authentication IEs) are included in each MA handshake message. Authentication sets are differentiated by identifying the MP acting as the supplicant during PTK derivation.

The mutual authentication IE indicates the beginning of an authentication set of IEs that relate to the establishment of a security association through the derivation of a single PTK. It allows sets of security IEs to be distinguished from other IEs within the management frame to simplify processing.

An authentication set is depicted in Table 9.

TABLE 9

Authentication Set

| MUTUAL AUTHENTICATION IE | IE | ... | EAPKIE (OPTIONAL) |
|---|---|---|---|

The supplicant address field of the mutual authentication IE contains the MAC address of the MP acting as supplicant for this security association. The IE count field indicates the number of IEs that belong to the authentication set, including the mutual authentication IE.

When an EAPKIE is included in the authentication set, it is the last IE of the set. The mutual authentication IE specifies the presence of an EAPKIE. When the EAPOL-Key message in an EAPKIE includes a MIC for protection, the MIC is calculated over all IEs in the set. Additionally, the MIC Protection subfield is set in the mutual authentication IE.

6.5.4.2.2 MA Handshake Message Contents

The following description of each of the MA handshake messages indicates the information elements that must be included, for purposes of the PTK derivation. Because the IEs are included within an authentication set, the order of IEs is important.

MA handshake Authentication Message 1 is an authentication management frame sent from subordinate to superordinate. The authentication frame indicates "Mesh Mutual Authentication" algorithm and sequence number "1". The frame contains the following IEs:

TABLE 10

MA handshake Authentication Message 1

| Order | Information | Notes |
|---|---|---|
| T.B.D. | Mutual authentication IE | Supplicant = subordinate; IE Count = 3; EAPKIE present |
| T.B.D. | RSNIE | One AKM and one pairwise cipher suite are specified, and must be among those advertised by the superordinate in its beacons and probe responses. The group cipher suite shall be the suite specified by the superordinate in its beacons and probe responses. The PMKID list contains 0 or more PMKIDs that the subordinate believes to be valid for the superordinate. |
| T.B.D. | EAPKIE | Message PTK1-#1 |
| T.B.D. | Mutual authentication IE | Supplicant = superordinate; IE Count = 3; EAPKIE present |
| T.B.D. | RSNIE | The RSNIE included is the same as that included in the subordinate's beacons and probe responses. (Note: the PMKID List is empty.) |
| T.B.D. | EAPKIE | Message PTK2-#1 |

MA handshake Authentication Message 2 is an authentication management frame sent from superordinate to subordinate. The authentication frame indicates "Mesh Mutual Authentication" algorithm and sequence number "2". The frame contains the following IEs:

TABLE 11

MA handshake Authentication Message 2

| Order | Information | Notes |
|---|---|---|
| T.B.D. | Mutual authentication IE | Supplicant = subordinate; IE Count = 4; EAPKIE present |
| T.B.D. | RSNIE | The AKM, pairwise cipher, and group cipher suite selectors shall be the same as those specified in the RSNIE of the subordinate authentication set sent in Authentication message 1. The PMKID list shall contain one PMKID (from those specified in message 1) referring to a valid PMKSA. If no specified PMKSA is valid, the PMKID list is empty. |
| T.B.D. | TIE | Contains Handshake Completion Deadline, specifying time window in which the association request message must be sent |
| T.B.D. | EAPKIE | Message PTK1-#2 |
| T.B.D. | Mutual authentication IE | Supplicant = superordinate; IE Count = 3; EAPKIE present |
| T.B.D. | RSNIE | One AKM and one pairwise cipher suite are specified, and must be among those advertised by the subordinate in Authentication message 1. The PMKID contains 0 or more PMKIDs that the superordinate believes to be valid for the subordinate. |
| T.B.D. | EAPKIE | Message PTK2-#2 |

MA handshake Association Request is an association request management frame sent from subordinate to superordinate. The frame contains the following IEs:

TABLE 12

MA handshake Association Request

| Order | Information | Notes |
|---|---|---|
| T.B.D. | Mutual authentication IE | Supplicant = subordinate; IE Count = 3; EAPKIE present, MIC Protection |
| T.B.D. | RSNIE | The PMKID list contains one PMKID, indicating the PMK to be used to derive PTK1. |
| T.B.D. | EAPKIE | Message PTK1-#3 |
| T.B.D. | Mutual authentication IE | Supplicant = superordinate; IE Count = 4; EAPKIE present, MIC Protection |
| T.B.D. | RSNIE | The PMKID list contains one PMKID, indicating the PMK to be used to derive PTK2. |
| T.B.D. | TIE | Contains Key Lifetime of PMK used to derive PTK2 |
| T.B.D. | EAPKIE | Message PTK2-#3 |

MA handshake Association Response is an association response management frame sent from superordinate to subordinate. The frame contains the following IEs:

TABLE 13

MA handshake Association Response

| Order | Information | Notes |
|---|---|---|
| T.B.D. | Mutual authentication IE | Supplicant = subordinate; IE Count = 4; EAPKIE present, MIC Protection |
| T.B.D. | RSNIE | The PMKID list contains one PMKID, indicating the PMK to be used to derive PTK1. |
| T.B.D. | TIE | Contains Key Lifetime of PMK used to derive PTK1 |
| T.B.D. | EAPKIE | Message PTK1-#4 |
| T.B.D. | Mutual authentication IE | Supplicant = superordinate; IE Count = 3; EAPKIE present, MIC Protection |
| T.B.D. | RSNIE | The PMKID list contains one PMKID, indicating the PMK to be used to derive PTK2. |
| T.B.D. | EAPKIE | Message PTK2-#4 |

The EAPOL-Key messages included in the MA handshake are defined in the following section.

6.5.4.2.3 EAPOL-Key Message Definitions

The following notation is used to describe EAPOL-Key frames:

EAPOL-Key [S, M, A, I, K, KeyRSC, Nonce, MIC, { }]

S: means the initial key exchange is complete (Secure bit).
M: means MIC is available in the message (Key MIC bit).
A: means response is required to this message (Key Ack bit).
I: install bit (for the pairwise key).
K: is the key type, P (Pairwise), G (Group). (Key Type bit)
KeyRSC: the Key RSC field (related to group key use)
Nonce: the Key Nonce field
MIC: the integrity check calculated with the KCK.
{ }: indicates the contents of the Key Data field, which may include one or more IEs or KDEs.

The eight EAPOL-Key messages used in the MA handshake are defined below:

PTK1-#1: EAPOL-Key[0, 0, 1, 0, P, 0, nonce(sub), 0, { }]
PTK1-#2: EAPOL-Key[0, 0, 0, 0, P, 0, nonce(sup), 0, { }]
PTK1-#3: EAPOL-Key[0, 1, 1, I(1), P, 0, nonce(sup), MIC, { }]
PTK1-#4: EAPOL-Key[1, 1, 0, I(1), P, KeyRSC(sup), nonce(sub), MIC, {GTK(sup)}]
PTK2-#1: EAPOL-Key[0, 0, 1, 0, P, 0, nonce(sub), 0, { }]
PTK2-#2: EAPOL-Key[0, 0, 0, 0, P, 0, nonce(sup), 0, { }]
PTK2-#3: EAPOL-Key[0, 1, 1, I(2), P, KeyRSC(sub), nonce(sub), MIC, {GTK(sub)}]
PTK2-#4: EAPOL-Key[1, 1, 0, I(2), P, 0, nonce(sub), MIC, { }]

In the above definitions,

The MIC is calculated over the authentication set of IEs, beginning with the mutual authentication IE and continuing to the end of the EAPKIE.

GTK(sup) is the group key created by the superordinate to protect its multicast traffic.

GTK(sub) is the group key created by the subordinate to protect its multicast traffic.

I(1) is 1 when the superordinate MP has a higher MAC address than that of the subordinate, and is 0 otherwise.

I(2) is 1 when the subordinate MP has a higher MAC address than that of the superordinate, and is 0 otherwise.

6.5.4.2.4 Liveness Assurance

The messages of the MA handshake must occur within a time limit to ensure that replay or precomputation attacks do not occur. The subordinate is responsible for ensuring that responses to its request messages are received within a time limit. (This restricts the time between the two Authentication messages as well as between the Association Request and Response.) The superordinate is responsible for ensuring that the subordinate issues an association request within the Handshake Completion Deadline, sent in Authentication message 2.

6.5.4.2.5 Extensibility

It is possible to extend the MA handshake for use in networks with features other than those described here. For example, the MA handshake could be used when a derived-key hierarchy is in place for distributing unique PMKs.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for mutual authentication of a first and a second node in a peer-to-peer network, the method comprising the steps of:

sending a first authentication message to the second node, the first authentication message comprising information needed for the second node to authenticate the first node and information needed by the second node for the second node to be authenticated by the first node, the first authentication message comprising a first pairwise master key identifier (PMKID) list;

receiving a second authentication message from the second node, the second authentication message comprising information needed by the first node for the first node to be authenticated by the second node and information needed for the first node to authenticate the second node, the second authentication message potentially comprising a selected PMKID from the first PMKID list, and wherein the second authentication exchange message contains a second PMKID list differing from the first PMKID list; and performing an authentication exchange after receiving the second message only if no selected PMKID is identified in the second authentication message.

2. The method of claim 1 further comprising the steps of:
sending an association request message to the second node, the association message comprising information needed by the second node to derive and validate a first Pairwise Transient Key (PTK)), and information needed by the second node to derive and validate a second PTK; and receiving an association response message from the second node, the association response message comprising information needed by the first node to validate the second PTK and information needed by the first node to validate the first PTK.

3. The method of claim 2 wherein the information in the association request message needed by the second node to derive and validate the first PTK comprises a mutual authentication information element identifying the first node as the node to be authenticated, a Robust Security Network (RSN) information element identifying a first pair-wise master key used for deriving the first PTK, and an Extensible Authentication Protocol over LAN Key (EAPOL-Key) message containing a message integrity check value calculated using the first PTK.

4. The method of claim 2 wherein the information in the association request message needed by the second node to derive and validate the second PTK comprises a mutual authentication information element identifying the second node as the node to be authenticated, an RSN information element identifying a second pair-wise master key used for deriving the second PTK, and an EAPOL-Key message containing a message integrity check value calculated using the second PTK, and a group key used by the first node.

5. The method of claim 2 wherein the information needed in the association response message by the first node to validate the first PTK comprises a mutual authentication information element identifying the first node as the node to be authenticated, an RSN information element identifying a first pair-wise master key used for deriving the first PTK, and an EAPOL-Key message containing a message integrity check value calculated using the first PTK, and a group key used by the second node.

6. The method of claim 2 wherein the information needed in the association response message by the first node to validate the second PTK comprises a mutual authentication information element identifying the second node as the node to be authenticated, an RSN information element identifying a second pair-wise master key used for deriving the second PTK, and an EAPOL-Key message containing a message integrity check value calculated using the second PTK.

7. The method of claim 1 wherein the information in the first authentication message needed for the second node to authenticate the first node comprises a mutual authentication information element identifying the first node as a node to be authenticated, an RSN information element identifying a key suite to be used for authenticating the first node, and an EAPOL-Key message containing a nonce created by the first node.

8. The method of claim 1 wherein the information needed in the first authentication message by the second node for the second node to be authenticated by the first node comprises a mutual authentication information element identifying the second node as the node to be authenticated, and an EAPOL-Key message containing a nonce created by the first node.

9. The method of claim 1 wherein the information needed in the second authentication message by the first node for the first node to be authenticated by the second node comprises a mutual authentication information element identifying the first node as a node to be authenticated, an RSN information element identifying a key suite to be used for authenticating the first node, and an EAPOL-Key message containing a nonce created by the second node.

10. The method of claim 1 wherein the information needed in the second authentication message for the first node to authenticate the second node comprises a mutual authentication information element identifying the second node as the node to be authenticated, an RSN information element identifying a key suite to be used for authenticating the second node, and an EAPOL-Key message containing a nonce created by the second node.

11. An apparatus for performing mutual authentication, the apparatus comprising:

a transmitter sending a first authentication message to a second node, the first authentication message comprising information needed for the second node to authenticate the first node and information needed by the second node for the second node to be authenticated by the first node, the first authentication message comprising a first pairwise master key identifier (PMKID) list;

a receiver receiving a second authentication message from the second node, the second authentication message comprising information needed by the first node for the first node to be authenticated by the second node and information needed for the first node to authenticate the second node, the second authentication message potentially comprising a selected PMKID from the first PMKID list, and wherein the second authentication exchange message contains a second PMKID list differing from the first PMKID list; and wherein the apparatus performs an authentication exchange after receiving the second message only if no selected PMKID is identified in the second authentication message.

12. The apparatus of claim 11 wherein:

the transmitter additionally sends an association request message to the second node, the association message comprising information needed by the second node to derive and validate a first Pair-wise Transient Key (PTK)), and information needed by the second node to derive and validate a second PTK; and the receiver additionally receives an association response message from the second node, the association response message comprising information needed by the first node to validate the second PTK and information needed by the first node to validate the first PTK.

13. The apparatus of claim 12 wherein the information in the association request message needed by the second node to derive and validate the first PTK comprises a mutual authentication information element identifying the first node as the node to be authenticated, a Robust Security Network (RSN) information element identifying a first pair-wise master key used for deriving the first PTK, and an Extensible Authentication Protocol over LAN Key (EAPOL-Key) message containing a message integrity check value calculated using the first PTK.

14. The apparatus of claim 12 wherein the information in the association request message needed by the second node to derive and validate the second PTK comprises a mutual authentication information element identifying the second node as the node to be authenticated, an RSN information element identifying a second pair-wise master key used for deriving the second PTK, and an EAPOL-Key message containing a message integrity check value calculated using the second PTK, and a group key used by the first node.

15. The apparatus of claim 12 wherein the information needed in the association response message by the first node to validate the first PTK comprises a mutual authentication information element identifying the first node as the node to be authenticated, an RSN information element identifying a first pair-wise master key used for deriving the first PTK, and an EAPOL-Key message containing a message integrity check value calculated using the first PTK, and a group key used by the second node.

16. The apparatus of claim 12 wherein the information needed in the association response message by the first node to validate the second PTK comprises a mutual authentication information element identifying the second node as the node to be authenticated, an RSN information element identifying a second pair-wise master key used for deriving the second PTK, and an EAPOL-Key message containing a message integrity check value calculated using the second PTK.

17. The apparatus of claim 11 wherein the information in the first authentication message needed for the second node to authenticate the first node comprises a mutual authentication information element identifying the first node as a node to be authenticated, an RSN information element identifying a key suite to be used for authenticating the first node, and an EAPOL-Key message containing a nonce created by the first node.

18. The apparatus of claim 17 wherein the RSN information element in the first authentication message also identifies a first pair-wise master key to be used for deriving the first PTK.

19. The apparatus of claim 11 wherein the information needed in the first authentication message by the second node for the second node to be authenticated by the first node comprises a mutual authentication information element identifying the second node as the node to be authenticated, and an EAPOL-Key message containing a nonce created by the first node.

20. The apparatus of claim 11 wherein the information needed in the second authentication message by the first node for the first node to be authenticated by the second node comprises a mutual authentication information element identifying the first node as a node to be authenticated, an RSN information element identifying a key suite to be used for authenticating the first node, and an EAPOL-Key message containing a nonce created by the second node.

21. The apparatus of claim 20 wherein the RSN information element in the second authentication message and needed for the first node to be authenticated by the second node also identifies a first pair-wise master key to be used for deriving the first PTK.

22. The apparatus of claim 11 wherein the information needed in the second authentication message for the first node to authenticate the second node comprises a mutual authentication information element identifying the second node as the node to be authenticated, an RSN information element identifying a key suite to be used for authenticating the second node, and an EAPOL-Key message containing a nonce created by the second node.

23. The apparatus of claim 22 wherein the RSN information element in the second authentication message and needed for the first node to authenticate the second node also identifies a second pair-wise master key to be used for deriving the second PTK.

* * * * *